US006956499B2

(12) United States Patent
Shinada

(10) Patent No.: US 6,956,499 B2
(45) Date of Patent: Oct. 18, 2005

(54) APPARATUS FOR CONTROLLING AN ELECTRONIC EQUIPMENT FOR VEHICLES

(75) Inventor: Akira Shinada, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 09/836,083

(22) Filed: Apr. 17, 2001

(65) Prior Publication Data

US 2001/0049960 A1    Dec. 13, 2001

(30) Foreign Application Priority Data

Apr. 20, 2000 (JP) ............................ P2000-118863

(51) Int. Cl.[7] ...................... G08C 19/00; B60R 25/00; G05B 19/00; G06F 7/00; G08B 29/00
(52) U.S. Cl. .................... 340/825.69; 340/5.72; 341/176; 307/10.1
(58) Field of Search ................ 340/825.69, 5.72, 340/5.7, 5.71, 5.74, 825.37; 341/176; 307/10.1; 455/343

(56) References Cited

U.S. PATENT DOCUMENTS

| 5,767,588 | A | * | 6/1998 | Nakaya et al. ............. 307/10.2 |
| 5,973,611 | A | * | 10/1999 | Kulha et al. ............... 340/5.62 |
| 6,002,341 | A | * | 12/1999 | Ohta et al. ................. 340/5.62 |
| 6,034,617 | A | * | 3/2000 | Luebke et al. ............. 340/5.62 |
| 6,181,254 | B1 | * | 1/2001 | Vogele .................. 340/825.69 |
| 6,326,885 | B1 | * | 12/2001 | Togashi ................. 340/426.17 |
| 6,339,340 | B1 | * | 1/2002 | Hsu ........................... 324/771 |
| 6,577,226 | B1 | * | 6/2003 | Steiner ..................... 340/5.62 |

FOREIGN PATENT DOCUMENTS

JP            10248179           9/1998    ............. H02J 7/14

* cited by examiner

Primary Examiner—Michael Horabik
Assistant Examiner—Nam V. Nguyen
(74) Attorney, Agent, or Firm—Jay H. Maioli

(57) ABSTRACT

An apparatus for controlling electronic equipment for vehicles. The apparatus detects a condition of use of a vehicle and causes the electronic equipment to be put in standby condition from which the electronic equipment can be immediately shifted into a normally operating condition.

9 Claims, 2 Drawing Sheets

APPARATUS FOR CONTROLLING AN ELECTRONIC EQUIPMENT FOR VEHICLES

BACKGROUND OF THE INVENTION

1. Field of the Invention

The present invention relates generally to apparatus for controlling an electronic equipment for vehicles, and more particularly, to an apparatus for controlling operations of an electronic equipment, such as an audio equipment, an equipment for navigation or the like, employed in a vehicle in response to conditions of use of the vehicle.

2. Description of the Prior Art

Various electronic equipment is employed in a vehicle, especially a passenger car, to be used as an electronic equipment for vehicles by a driver or other passenger, in addition to motor-operated apparatus, each of which performs its proper functions with the aid of electronic power, such as a motor-operated door locking mechanism for locking and unlocking doors of the vehicle, a motor-operated window mechanism for opening and closing windows, a motor-operated mirror mechanism for adjusting door mirrors and so on. For example, an audio equipment, a television receiver, an equipment for navigation, a wireless telephone equipment and so on are applied as the electronic equipment for vehicles. The electronic equipment for vehicles, such as the audio equipment, the equipment for navigation or the like, operates usually under an operation control by a control unit constituted by, for example, a microcomputer provided in the vehicle.

When the vehicle in which the electronic equipment for vehicles is employed is used to drive, the electronic equipment is put in a standby condition from which the equipment can be immediately shifted into a normally operating condition with manual handling to a switch or the like provided on the equipment by a driver or passenger or in the normally operating condition into which the equipment has shifted from the standby condition. The standby condition of the electronic equipment for vehicles is started usually when the driver handles a key put in a key switch portion provided in the vehicle for starting an engine mounted on the vehicle.

The key switch portion provided in the vehicle is provided with an accessory position in addition to a start position, a switch-on position, a lock position and so on. When the key is put in the key switch portion and handled to correspond to the accessory position, the motor-operated apparatus and an electronic equipment for vehicles employed in the vehicle is supplied with electric power through a specific power supply line called an accessory line from a battery or a generator provided in the vehicle. The control unit is operative to detect a rising in voltage of the electric power supplied through the accessory line and when the rising in voltage of the electric power supplied through the accessory line is detected by the control unit, the electronic equipment for vehicles employed in the vehicle is shifted into the standby condition from a nonoperating condition (sleep condition).

Further, there has been previously proposed such a system that an electronic equipment for vehicles, such as a television receiver having a liquid crystal display panel portion, is caused to commence to operate during a self-starting motor provided in a vehicle in which the electronic equipment for vehicles is employed is rotating for starting an engine mounted on the vehicle or after the self-starting motor has finished rotating, as shown in, for example, Japanese patent laid-open publication No. HEI10-248179.

In the case where the electronic equipment for vehicles is put in the standby condition in response to the rising in voltage of the electric power supplied through the accessory line or the electronic equipment for vehicles is caused to commence to operate during the self-starting motor is rotating or after the self-starting motor has finished rotating, as described above, it is usual that the electronic equipment for vehicles is not put in the standby condition nor caused to commence to operate until a condition of use of the vehicle is started by, for example, an unlocking operation to a door lock to open a door and then the driver on a driver's seat puts the key in the key switch portion and handles the key for causing the vehicle to commence driving.

It is generally necessary for the electronic equipment for vehicles to spend a predetermined transition time for performing normal operations properly on the occasion of the shift to the standby condition from the nonoperating condition or the commencement of the operation. Especially, in case of the electronic equipment for vehicles in which a memory device in the hard disc type is driven, such as the equipment for navigation, the transition time necessitated on the occasion of the shift to the standby condition from the nonoperating condition or the commencement of the operation comes to be relatively long. Consequently, when the electronic equipment for vehicles is put in the standby condition in response to the rising in voltage of the electric power supplied through the accessory line or the electronic equipment for vehicles is caused to commence to operate during the self-starting motor is rotating or after the self-starting motor has finished rotating, the driver or passenger having gotten on the vehicle can not cause the electronic equipment for vehicles to perform the normal operations properly just after the condition of use of the vehicle is started by, for example, the unlocking operation to the door lock to open the door, but has to waste a certain time corresponding to the transition time mentioned above after the key is put in the key switch portion and handled for causing the vehicle to commence driving in order to cause the electronic equipment for vehicles to perform the normal operations properly. This brings about inconveniences on the use of the electronic equipment for vehicles and if the electronic equipment for vehicles is especially the equipment for navigation, such inconveniences are especially displeasing to the driver or passenger.

OBJECTS AND SUMMARY OF THE INVENTION

Accordingly, it is an object of the present invention to provide an apparatus for controlling an electronic equipment for vehicles, such as an audio equipment, an equipment for navigation or the like employed in a vehicle, to operate in response to conditions of use of the vehicle, which avoids the aforementioned disadvantages encountered with the prior art.

Another object of the present invention is to provide an apparatus for controlling an electronic equipment for vehicles, such as an audio equipment, an equipment for navigation or the like employed in a vehicle, to operate in response to conditions of use of the vehicle, by which a driver or passenger having gotten on the vehicle can cause the electronic equipment for vehicles to perform normal operations properly without wasting time just after the condition of use of the vehicle is started.

A further object of the present invention is to provide an apparatus for controlling an electronic equipment for vehicles, such as an audio equipment, an equipment for navigation or the like employed in a vehicle, to operate in response to conditions of use of the vehicle, by which the electronic equipment for vehicles is put in a standby condition from which the equipment can be immediately shifted into a normally operating condition as occasion demands when the commencement of the condition of use of the vehicle is detected.

According to the present invention, there is provided an apparatus for controlling an electronic equipment for vehicles, which comprises detection means for detecting the commencement of a condition of use of a vehicle which employs an electronic equipment for vehicles, and control means for controlling operations of the electronic equipment for vehicles, said control means being operative to cause the electronic equipment to be put in a standby condition from which the electronic equipment can be immediately shifted into a normally operating condition when the commencement of the condition of use of the vehicle is detected by the detection means.

In one embodiment of apparatus for controlling an electronic equipment for vehicles according to the present invention, the detection means is provided in a control unit which is shifted into a normally operating condition from a standby condition when the condition of use of the vehicle is commenced and operative to detect the commencement of the condition of use of the vehicle by detecting the shift of the control unit into the normally operating condition from the standby condition.

In another embodiment of apparatus for controlling an electronic equipment for vehicles according to the present invention, the detection means is operative to detect the commencement of the condition of use of the vehicle with the reception of a lock control signal for unlocking a door lock mechanism provided in the vehicle which is detected by a lock control signal receiving portion.

In a further embodiment of apparatus for controlling an electronic equipment for vehicles according to the present invention, the detection means is operative to detect the commencement of the condition of use of the vehicle with a manual handling to a door knob of the vehicle for unlocking a door lock mechanism provided in the vehicle which is detected by a door knob handling detecting portion.

In the apparatus thus constituted in accordance with the present invention, the detection means for detecting the commencement of the condition of use of the vehicle and the control means for controlling operations of the electronic equipment for vehicles are provided for operating in such a manner that the electronic equipment is put in the standby condition from which the electronic equipment can be immediately shifted into the normally operating condition as occasion demands by the control means when the commencement of the condition of use of the vehicle is detected by the detection means. The detection means is operative to detect the commencement of the condition of use of the vehicle, for example, by detecting the shift of the control unit into the normally operating condition from the standby condition, with the reception of the lock control signal for unlocking the door lock mechanism provided in the vehicle which is detected by the lock control signal receiving portion, or with the manual handling to the door knob of the vehicle for unlocking the door lock mechanism provided in the vehicle which is detected by the door knob handling detecting portion.

With the apparatus according to the present invention, the electronic equipment for vehicles employed in the vehicle is put in the stand by condition from which the electronic equipment can be immediately shifted into the normally operating condition as occasion demands when the condition of use of the vehicle is commenced Accordingly, a driver or passenger having gotten on the vehicle can cause the electronic equipment for vehicles to perform normal operations properly without wasting time just after the condition of use of the vehicle is commenced.

The above, and other objects, features and advantages of the present invention will become apparent from the following detailed description which is to be read in conjunction with the accompanying drawings.

DESCRIPTION OF THE PREFERRED EMBODIMENTS

The invention will now be described by way of example with reference to the accompanying drawings.

Figure 1:
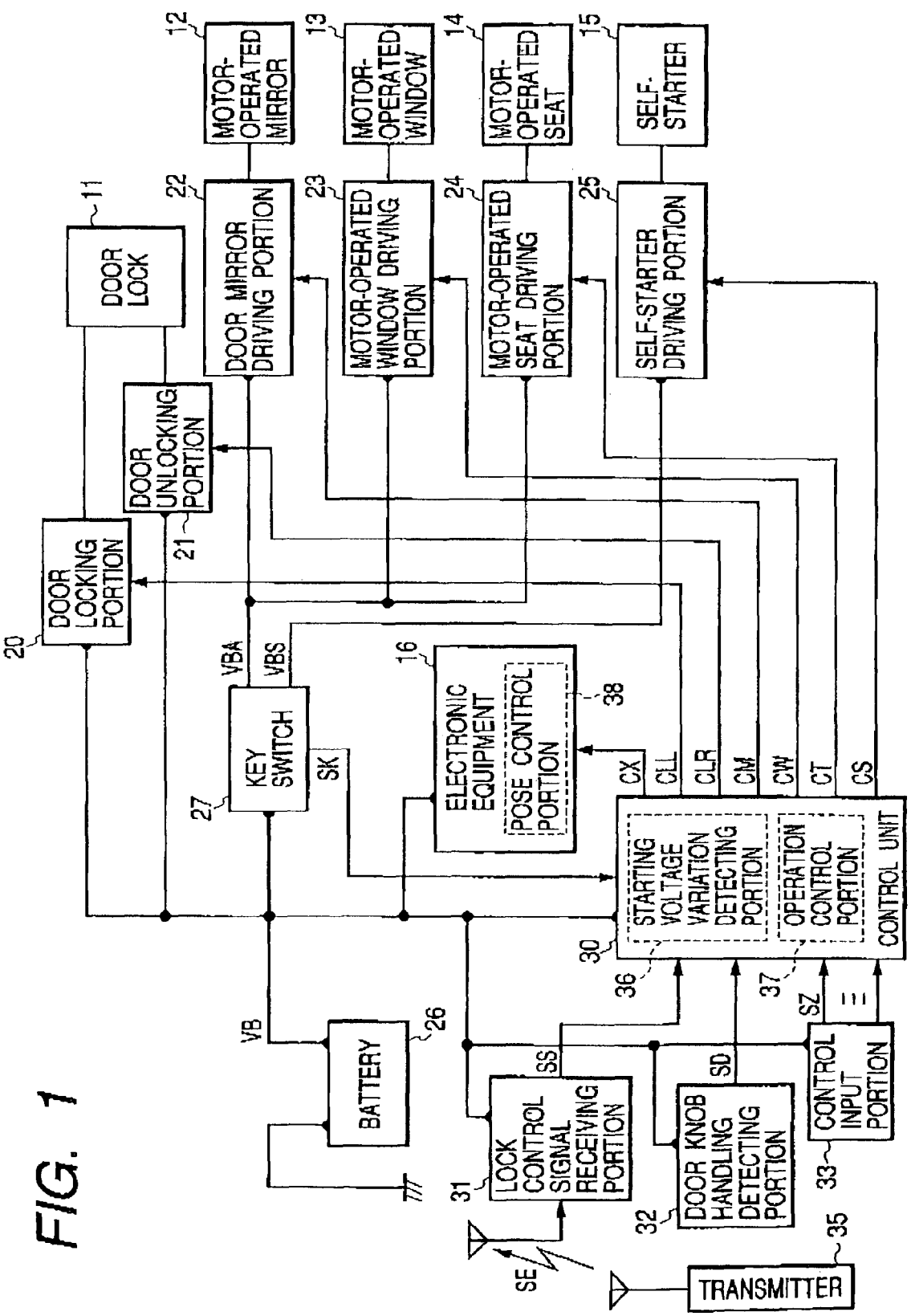
FIG. 1 is a schematic block diagram showing an electronic control system for vehicles to which one embodiment of apparatus for controlling an electronic equipment for vehicles according to the present invention is applied.

FIG. 1 shows an embodiment of apparatus for controlling an electronic equipment for vehicles according to the present invention.

Referring to FIG. 1, an electronic control system for vehicles comprises a door lock mechanism 11, a motor-operated mirror 12, a motor-operated window 13, a motor-operated seat 14, a self starter 15 and an electronic equipment 16 for vehicles, which are provided in and on a vehicle.

The door lock mechanism 11 is operative to put doors of the vehicle selectively in locked and unlocked conditions when the doors are closed. The motor-operated mirror 12 is mounted on the door to project to the outside of the vehicle and a direction of a mirror face of the motor-operated mirror 12 is adjusted. The motor-operated window 13 is provided on a body of the vehicle or the door of the vehicle to be operative to open and close selectively. The motor-operated seat 14 is provided in the cabin of the vehicle, the position of which is adjusted before and behind, the height of which is adjusted up and down, and a seat back of which is adjusted in angle, for example. The self starter 15 is provided to accompany with an engine mounted on the vehicle and comprises, for example, a self-starting motor for starting the engine.

Figure 2:
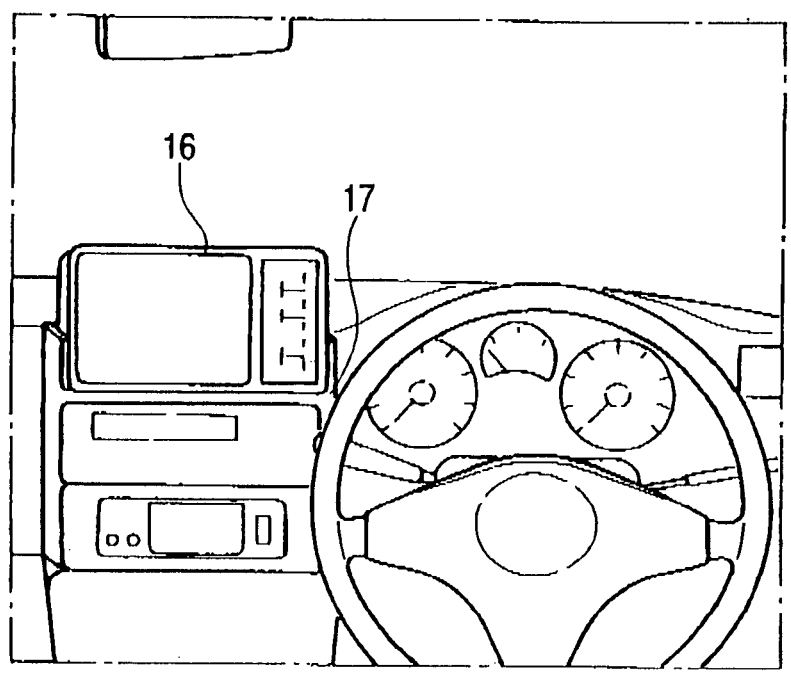
FIG. 2 is a schematic partial perspective view showing an example of an electronic equipment for vehicles provided in a cabin of a vehicle to constitute the electronic control system for vehicles shown in FIG. 1.

The electronic equipment 16 for vehicles is selected from, for example, an audio equipment, a television receiver, an equipment for navigation, a wireless telephone equipment and so on, and operative to perform its operations in response to a manual handling by a driver or passenger in the cabin of the vehicle. FIG. 2 shows an example of the electronic equipment 16 for vehicles which is the equipment for navigation provided on a console shelf 17 forming a front end portion of the cabin of the vehicle. The electronic equipment 16 for vehicles contains a pause control portion which is operative to cause the electronic equipment 16 to have a temporary nonoperating state in response to a manual handling to an actuating portion of the electronic equipment 16 for vehicles.

In relation to the door lock mechanism 11, a door locking portion 20 for driving the door lock mechanism 11 provided in the door closed to be put in a locked condition and a door unlocking portion 21 for driving the door lock mechanism 11 provided in the door closed to be put in an unlocked condition are provided. Further, a door mirror driving portion 22 for driving the motor-operated mirror 12 to adjust the direction of the mirror face of the motor-operated mirror 12 is provided in relation to the motor-operated mirror 12, a motor-operated window driving portion 23 for driving the motor-operated window 13 to open or close is provided in relation to the motor-operated window 13, and a motor-operated seat driving portion 24 for driving the motor-operated seat 14 to adjust its position, height and angle of the seat back is provided in relation to the motor-operated seat 14.

Further, in relation to the self starter 15, a self-starter driving portion 25 is provided for driving the self starter 15 to operate for starting the engine.

Each of the door locking portion 20 and the door unlocking portion 21 is supplied with a voltage VB as electric power from a battery 26 provided on the vehicle. The voltage VB is also supplied to a key switch portion 27. In the key switch portion 27, a key 28 put in the key switch portion 27 as shown in FIG. 3 is handled.

Figure 3:
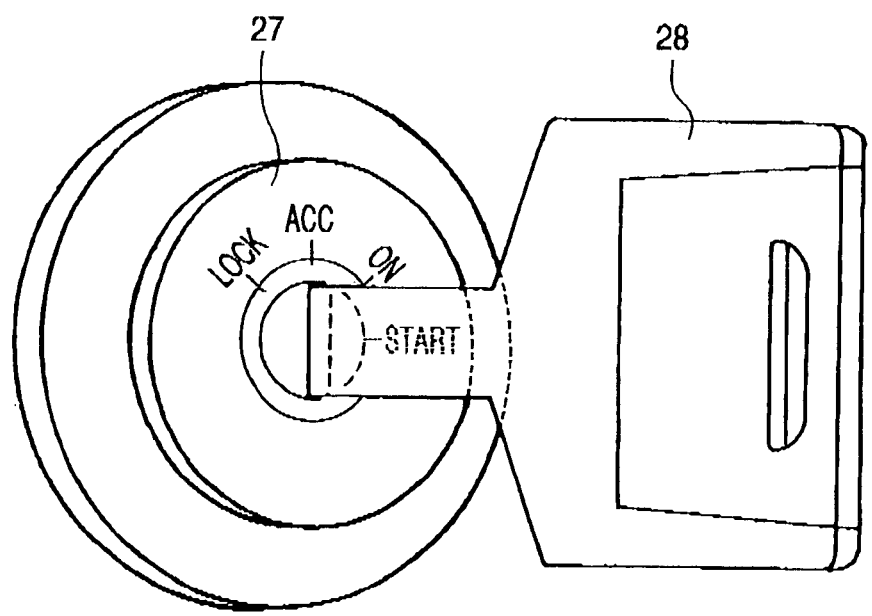
FIG. 3 is a schematic perspective view used for explaining a key switch portion constituting the electronic control system for vehicles shown in FIG. 1.

In FIG. 3, the key switch portion 27 is provided with a lock position LOCK, an accessory position ACC, a switch-on position ON, and a start position START. The key 28 is put in the key switch portion 27 and pulled out from the key switch portion 27, selectively. The key 28 put in the key switch portion 27 is rotated to be corresponding to the accessory position ACC or the switch-on position ON. The key 28 corresponding to the switch-on position ON may be further rotated to correspond to the start position START. Then, the key 28 corresponding to the start position START is returned to the switch-on position ON when a force acting on the key 28 to keep the same in correspondence with the start position START is eliminated.

When the key 28 put in the key switch portion 27 is set to correspond to the accessory position ACC or the switch-on position ON, the door mirror driving portion 22, the motor-operated window driving portion 23 and the motor-operated seat driving portion 24 are supplied with the voltage VB through the key switch portion 27 from the battery 26 by way of an operation voltage VBA. When the key 28 put in the key switch portion 27 is set to correspond to the start position START, the self-starter driving portion 25 is supplied with the voltage VB through the key switch portion 27 from the battery 26 by way of an operation voltage VBA.

Further, when the key 28 put in the key switch portion 27 is set to correspond to the switch-on position ON, an ignition device (not shown in the figures) provided in the vehicle is continuously supplied with the voltage VB through the key switch portion 27 from the battery 26, so that the ignition device operates to keep the engine mounted on the vehicle working.

The electronic equipment 16 for vehicles is also supplied with the voltage VB from the battery 26. Therefore, the electronic equipment 16 for vehicles can be put selectively in a nonoperating condition, a standby condition and a normally operating condition under a situation wherein an operation voltage based on the voltage VB from the battery 26 is obtained.

In the electronic control system for vehicles shown in FIG. 1, a control unit 30 is provided for controlling the operations of the door locking portion 20, the door unlocking portion 21, the door mirror driving portion 22, the motor-operated window driving portion 23, the motor-operated seat driving portion 24, the self-starter driving portion 25 and the electronic equipment 16 for vehicles. A locking control signal receiving portion 31, a door knob handling detecting portion 32 and a control input portion 33 are connected with the control unit 30. A portion which includes the control unit 30 and the locking control signal receiving portion 31, the door knob handling detecting portion 32 and the control input portion 33 connected with the control unit 30, constitutes one example of the apparatus for controlling an electronic equipment for vehicles according to the present invention.

Each of the control unit 30, the locking control signal receiving portion 31, the door knob handling detecting portion 32 and the control input portion 33 is supplied with the voltage VB from the battery 26 so as to obtain an operation voltage based on the voltage VB and operate with the operation voltage thus obtained.

Under a situation wherein the vehicle is not in the condition of use and the doors of the vehicle are locked by the door lock mechanism 11, when a lock control signal SE for commencing the condition of use of the vehicle is transmitted from a transmitter 35, the lock control signal receiving portion 31 receives the lock control signal SE and produces a signal reception output signal SS based on the lock control signal SE received thereby. The signal reception output signal SS is supplied to the control unit 30 from the lock control signal receiving portion 31.

The control unit 30 is in its standby condition when the vehicle is not in the condition of use and shifted into its normally operating condition from the standby condition when the signal reception output signal SS is supplied from the lock control signal receiving portion 31. That is, the control unit 30 is shifted into the normally operating condition from the standby condition when the condition of use of the vehicle is commenced. With such shift of the control unit 30 into the normally operating condition from the standby condition, starting voltage variations occur in a power supplying line, through which the control unit 30 is supplied with the voltage VB from the battery 26, in the control unit 30.

Further, under the situation wherein the vehicle is not in the condition of use and the doors of the vehicle are locked by the door lock mechanism 11, when a door knob mounted on the door is manually handled, without using the transmitter 35, for commencing the condition of use of the vehicle, a door knob handling detecting portion 32 detects the manual handling to the door knob and produces a detection output signal SD in response to the manual handling to the door knob detected thereby. The detection output signal SD is supplied to the control unit 30 from the door knob handling detecting portion 32.

The control unit 30 is also shifted into the normally operating condition from the standby condition when the detection output signal SD is supplied from the door knob handling detecting portion 32. That is, the control unit 30 is shifted into the normally operating condition from the standby condition when the condition of use of the vehicle is commenced. In such a case also, with such shift of the control unit 30 into the normally operating condition from the standby condition, the starting voltage variations occur in the power supplying line, through which the control unit 30 is supplied with the voltage VB from the battery 26, in the control unit 30.

The starting voltage variations thus occurring in the control unit 30 is detected by a starting voltage variation detecting portion 36 contained in the control unit 30. The starting voltage variation detecting portion 36 is operative to detect the shift of the control unit 30 into the normally operating condition from the standby condition by detecting the voltage variations thus occurring in the control unit 30 and thereby detect the commencement of the condition of use of the vehicle.

Namely, the starting voltage variation detecting portion 36 contained in the control unit 30 constitutes a use commencement detecting portion for detecting the commencement of the condition of use of the vehicle and is operative to detect the commencement of the condition of use of the vehicle by detecting the shift of the control unit 30 into the normally operating condition from the standby condition and to detect the shift of the control unit 30 into the normally operating condition from the standby condition by detecting the starting voltage variations occurring in the control unit 30.

When the signal reception output signal SS from the locking control signal receiving portion 31 or the detection output signal SD from the door knob handling detecting portion 32 is supplied to the control unit 30 and the commencement of the condition of use of the vehicle is detected by the starting voltage variation detecting portion 36, an operation control portion 37 contained in the control unit 30 produces a control signal CLR for the door unlocking portion 21. The control signal CLR is supplied to the door unlocking portion 21 from the control unit 30 and the door unlocking portion 21 which operates with the voltage VB by way of the operation voltage is operative to drive the door lock mechanism 11 to be put in the unlocked condition.

The operation control portion 37 contained in the control unit 30 produces further a control signal CX for putting the electronic equipment 16 for vehicles in its standby condition from which the electronic equipment 16 for vehicles can be immediately shifted into its normally operating condition as occasion demands when the commencement of the condition of use of the vehicle is detected by the starting voltage variation detecting portion 36. The control signal CX is supplied to the electronic equipment 16 for vehicles from the control unit 30 and the electronic equipment 16 for vehicles is shifted into the standby condition from its nonoperating condition in response to the control signal CX. Accordingly, the electronic equipment 16 for vehicles is put in the standby condition when the condition of use of the vehicle is commenced. The electronic equipment 16 for vehicles put in the standby condition is immediately shifted into the normally operating condition, for example, when the driver or passenger of the vehicle handles manually actuating portions of the electronic equipment 16 for vehicles.

However, when a pause control portion 38 which is contained in the electronic equipment 16 for vehicles is performing its function, the electronic equipment 16 for vehicles is operative to give priority to the pause control portion 38 for functioning so as to keep the standby condition without being shifted into the normally operating condition even though the control signal CX is supplied to the electronic equipment 16 for vehicles from the control unit 30. Then, when the function of the pause control portion 38 is ceased, the electronic equipment 16 for vehicles is shifted into the normally operating condition from the standby condition. Consequently, the electronic equipment 16 for vehicles is prevented from being unwillingly put in the normally operating condition when the condition of use of the vehicle is commenced.

Then, when the key 28 put in the key switch portion 27 is rotated to correspond to the start position START through the accessory position ACC and the switch-on position ON, the voltage VB from the battery 26 is supplied through the key switch portion 27 to the self-starter driving portion 25 by way of an operation voltage thereto and a key position signal SK is supplied to the control unit 30 from the key switch portion 27. In the control unit 30 to which the key position signal SK is supplied, the operation control portion 37 produces a control signal CS for causing the self starter 15 to operate. The control signal CS is supplied to the self-starter driving portion 25 from the control unit 30 and the self-starter driving portion 25 which operates with the voltage VB supplied from the battery 26 by way of the operation voltage is operative to cause the self starter 15 to operate in response to the control signal CS.

After the self starter 15 operates and thereby the engine mounted on the vehicle is started, the key 28 is moved to correspond to the switch-on position ON in the key switch portion 27, so that the door mirror driving portion 22, the motor-operated window driving portion 23 and the motor-operated seat driving portion 24 are supplied with the voltage VB through the key switch portion 27 from the battery 26 by way of the operation voltage VBA.

Under such a condition as mentioned above, when a manual operation, for example, a control input operation for adjusting the motor-operated mirror 12, the motor-operated window 13 or the motor-operated seat 14, is carried out to the control input portion 33, a control input signal SZ is produced by the control input portion 33 in response to the manual operation to be supplied to the control unit 30. In the control unit 30 to which the control input signal SZ is supplied, the operation control portion 37 produces a control signal CM, CW or CT in response to the control input signal SZ. The control signal CM, CW or CT thus produced is supplied to the door mirror driving portion 22, the motor-operated window driving portion 23 or the motor-operated seat driving portion 24 from the control unit 30. The door mirror driving portion 22, the motor-operated window driving portion 23 or the motor-operated seat driving portion 24 from the control unit 30 which operates with the voltage VB supplied from the battery 26 by way of the operation voltage is operative to adjust the motor-operated mirror 12, the motor-operated window 13 or the motor-operated seat 14.

Under a situation wherein the vehicle is not in the condition of use and the doors of the vehicle are locked by the door lock mechanism 11, when a lock control signal SE is transmitted from a transmitter 35 for commencing the condition of use of the vehicle, the lock control signal receiving portion 31 receives the lock control signal SE and produces a signal reception output signal SS based on the lock control signal SE received thereby. The signal reception output signal SS is supplied to the control unit 30 from the lock control signal receiving portion 31.

The control unit 30 is in its standby condition when the vehicle is not in the condition of use and shifted into its normally operating condition from the standby condition when the signal reception output signal SS is supplied from the lock control signal receiving portion 31. That is, the control unit 30 is shifted into the normally operating condition from the standby condition when the condition of use of the vehicle is commenced. With such shift of the control unit 30 into the normally operating condition from the standby condition, starting voltage variations occur in a power supplying line, through which the control unit 30 is supplied with the voltage VB from the battery 26, in the control unit 30.

Besides, under a situation wherein the condition of use of the vehicle has finished and the doors of the vehicle are closed, when a lock control signal SE for putting the door lock mechanism 11 in the locked condition is transmitted from the transmitter 35, the lock control signal receiving portion 31 receives the lock control signal SE and produces a signal reception output signal SS based on the lock control signal SE received thereby. The signal reception output signal SS is supplied to the control unit 30 from the lock control signal receiving portion 31.

The control unit 30 is shifted into the normally operating condition from the standby condition when the signal reception output signal SS is supplied from the lock control signal receiving portion 31 and the operation control portion 37 contained in the control unit 30 produces a control signal CLL for the door locking portion 20. The control signal CLL is supplied to the door locking portion 20 from the control unit 30 and the door locking portion 20 which operates with the voltage VB by way of the operation voltage is operative to drive the door lock mechanism 11 to be put in the locked condition.

Further, under the situation wherein the condition of use of the vehicle has finished and the doors of the vehicle are closed, when the door knob mounted on the door is manually handled, without using the transmitter 35, for putting the door lock mechanism 11 in the locked condition, the door knob handling detecting portion 32 detects the manual handling to the door knob and produces a detection output signal SD in response to the manual handling to the door knob detected thereby. The detection output signal SD is supplied to the control unit 30 from the door knob handling detecting portion 32.

The control unit 30 is also shifted into the normally operating condition from the standby condition when the detection output signal SD is supplied from the door knob handling detecting portion 32 and the operation control portion 37 contained in the control unit 30 produces also the control signal CLL for the door locking portion 20. The control signal CLL is supplied to the door locking portion 20 from the control unit 30 and the door locking portion 20 which operates with the voltage VB by way of the operation voltage is operative to drive the door lock mechanism 11 to be put in the locked condition.

As described above, with the lock control signal SE transmitted from the transmitter 35 for putting the door lock mechanism 11 in the locked condition or the manual handling to the door knob for putting the door lock mechanism 11 in the locked condition, the situation wherein the vehicle is not in the condition of use and the doors of the vehicle are locked by the door lock mechanism 11 is obtained.

What is claimed is:

1. An apparatus for controlling an electronic equipment for vehicles comprising:
   detection means for detecting a commencement of a condition of use of a vehicle employing the electronic equipment for vehicles;
   control means for controlling operations of the electronic equipment for vehicles, wherein when the commencement of the condition of use of the vehicle is detected by the detection means, said control means outputs a signal to cause the electronic equipment to shift from a nonoperative condition to a standby-condition from which the electronic equipment can be shifted into a normally operating condition; and
   pause control means included in said electronic equipment receiving the signal output from the control means and for placing the electronic equipment in a pause mode for a predetermined period of time before shifting the electronic equipment from the standby-condition to the normally operating condition.

2. The apparatus according to claim 1, wherein said detection means is provided in a control unit which is shifted into the normally operating condition from the standby condition for controlling operations of a motor-operated apparatus employed in the vehicle when the condition of use of the vehicle is commenced, and is operative to detect the commencement of the condition of use of the vehicle by detecting a shift of the control unit into the normally operating condition from the standby condition.

3. The apparatus according to claim 2, wherein said detection means is operative to detect the shift of the control unit into the normally operating condition from the standby condition by detecting starting voltage variations occurring in the control unit.

4. The apparatus according to claim 2, wherein said control unit is shifted into the normally operating condition from the standby condition when the reception of a lock control signal for unlocking door lock means provided in the vehicle is detected by lock control signal receiving means provided in the vehicle.

5. The apparatus according to claim 3, wherein said control unit is shifted into the normally operating condition from the standby condition when the reception of a lock control signal for unlocking door lock means provided in the vehicle is detected by lock control signal receiving means provided in the vehicle.

6. The apparatus according to claim 2, wherein said control unit is shifted into the normally operating condition from the standby condition when a manual handling to a door knob of the vehicle for unlocking door lock means provided in the vehicle is detected by door knob handling detecting means provided in the vehicle.

7. The apparatus according to claim 3, wherein said control unit is shifted into the normally operating condition from the standby condition when a manual handling to a door knob of the vehicle for unlocking door lock means provided in the vehicle is detected by door knob handling detecting means provided in the vehicle.

8. The apparatus according to claim 1, wherein said detecting means is operative to detect the commencement of the condition of use of the vehicle with the reception of a lock control signal for unlocking door lock means provided in the vehicle and detected by lock control signal receiving means provided in the vehicle.

9. The apparatus according to claim 1, wherein said detection means is operative to detect the commencement of the condition of use of the vehicle with a manual handling to a door knob of the vehicle for unlocking a door lock mechanism provided in the vehicle detected by door knob handling detecting means provided in the vehicle.

* * * * *